May 21, 1957  J. E. ROSE ET AL  2,793,024
MULTIPLE BIN HOPPER AND AGGREGATE WEIGHING EQUIPMENT
Filed March 6, 1956  10 Sheets-Sheet 1

INVENTOR.
MAX S. BARKER
JOHN E. ROSE
BY
Harry H. Hitzeman
ATTORNEY.

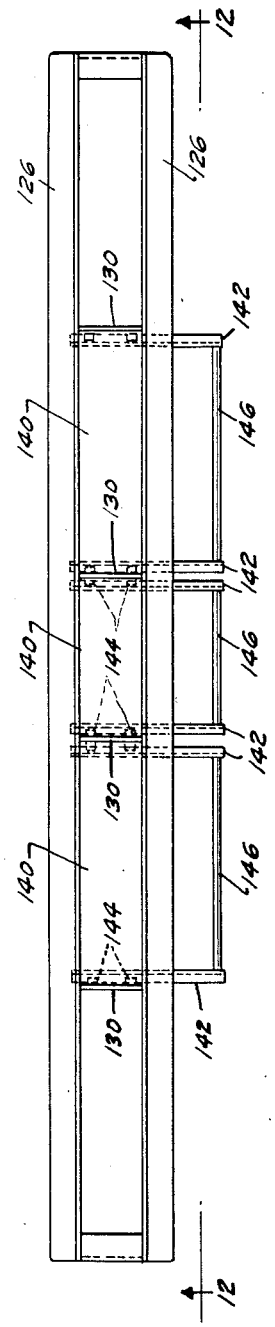
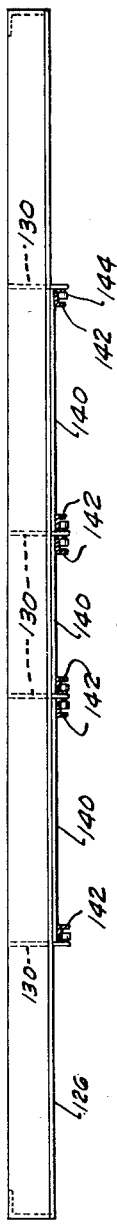
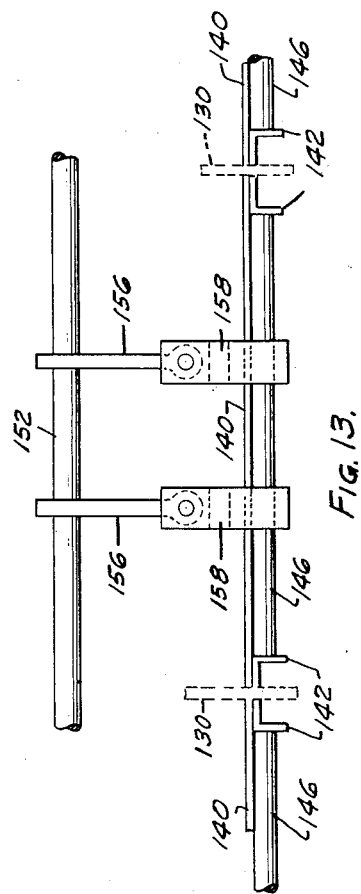

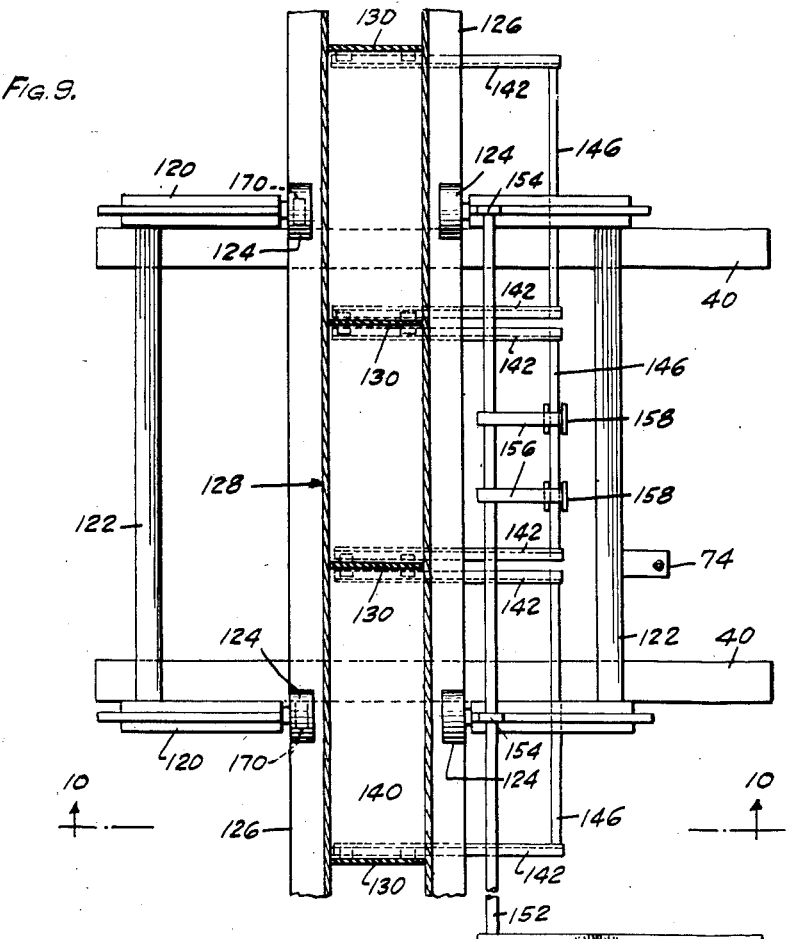
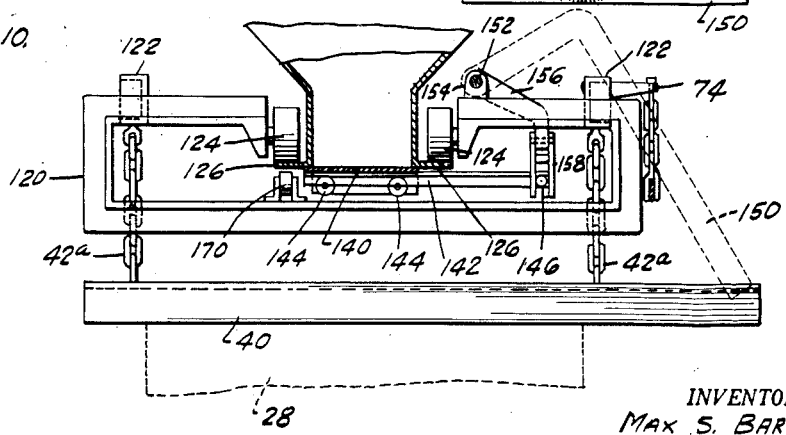

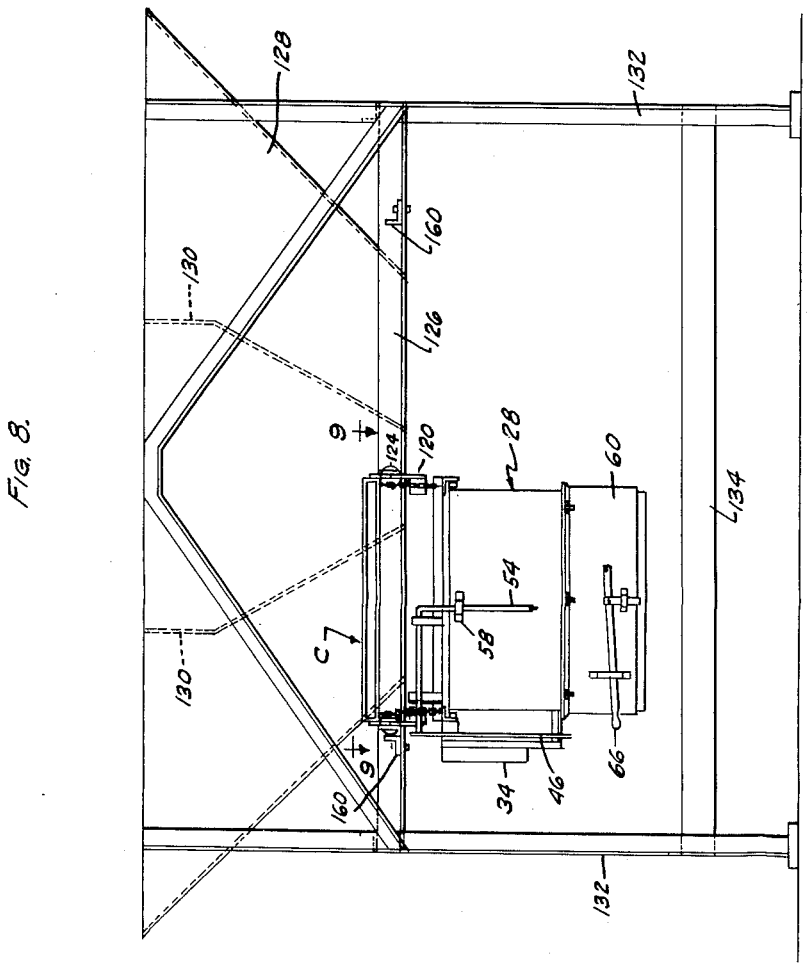

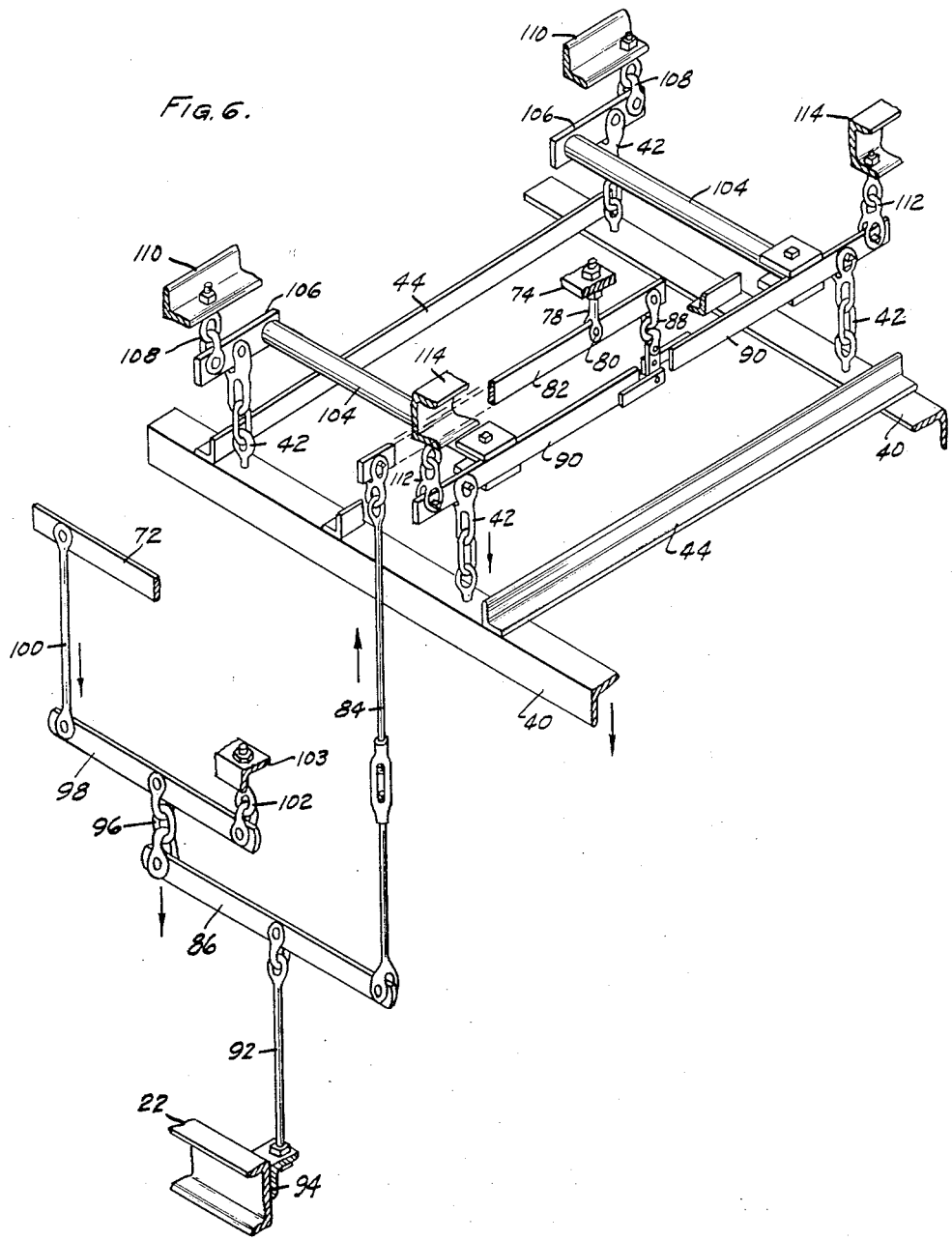

United States Patent Office 2,793,024
Patented May 21, 1957

2,793,024

MULTIPLE BIN HOPPER AND AGGREGATE WEIGHING EQUIPMENT

John E. Rose and Max S. Barker, Marshalltown, Iowa

Application March 6, 1956, Serial No. 569,718

16 Claims. (Cl. 265—27)

Our invention relates to multiple bin hoppers and aggregate weighing equipment of the type into which sand, gravel and stone are dumped preparatory to weighing the same for dumping into a concrete mixer skip.

Our invention relates more particularly to a twin or triple bin hopper from which gravel or stone may be dumped to a desired weight into a weighing hopper which is so supported that after the desired amounts of the aggregate are received and weighed, it may be rolled forward to dump the material received from the double or triple hopper into the concrete mixer skip.

The principal object of the invention is to provide an improved weighing hopper of the type having a scale so supported in cooperation with the same that after two or more types of aggregate have been dumped into the hopper, the same may be moved forward for dumping.

A further object of the invention is to provide an improved construction of weighing hopper which is mounted on a wheeled support so that it can be moved both back and forth under supply bins to receive aggregate of various types, and after the desired quantities of any of the aggregate have been received and weighed, it may be moved forward for dumping into a concrete mixer skip.

A further object of the invention is to provide an improved weighing hopper of the type described which is so suspended from a stationary support that accurate weighing of various types of aggregate received by the same may be done, and then the hopper may be moved forward for discharging.

A further object of the invention is to provide an improved weighing hopper so mounted that both the scale and the hopper may be moved back and forth under a series of storage bins in which aggregate is provided to receive desired quantities of the same, the combined aggregate may be weighed, and then the hopper may be moved at right angles to the direction of travel of the combined scale and hopper mechanism for dumping the same into a concrete mixer skip.

The present application is an improvement over the John E. Rose patent on Twin Bin Hopper Construction, issued March 6, 1956, bearing Patent No. 2,737,315.

Other objects and advantages will be more apparent from the following description wherein reference is had to the accompanying drawings, upon which:

Fig. 6 is a schematic perspective view showing the operation and connection of the weighing mechanism and the support rails for the multiple hopper;

Fig. 8 is a side elevational view of the same;

Fig. 9 is a fragmentary plan sectional view taken generally on the line 9—9 of Fig. 8;

Fig. 10 is a fragmentary vertical sectional view taken generally on the line 10—10 of Fig. 9;

Fig. 11 is a plan view of the track and door assembly attached to the lower end of the storage bins;

Fig. 12 is a side sectional view thereof taken on the line 12—12 of Fig. 11; and Fig. 13 is a fragmentary side elevational view of the stationary bin doors and operating mechanism.

Figure 1:
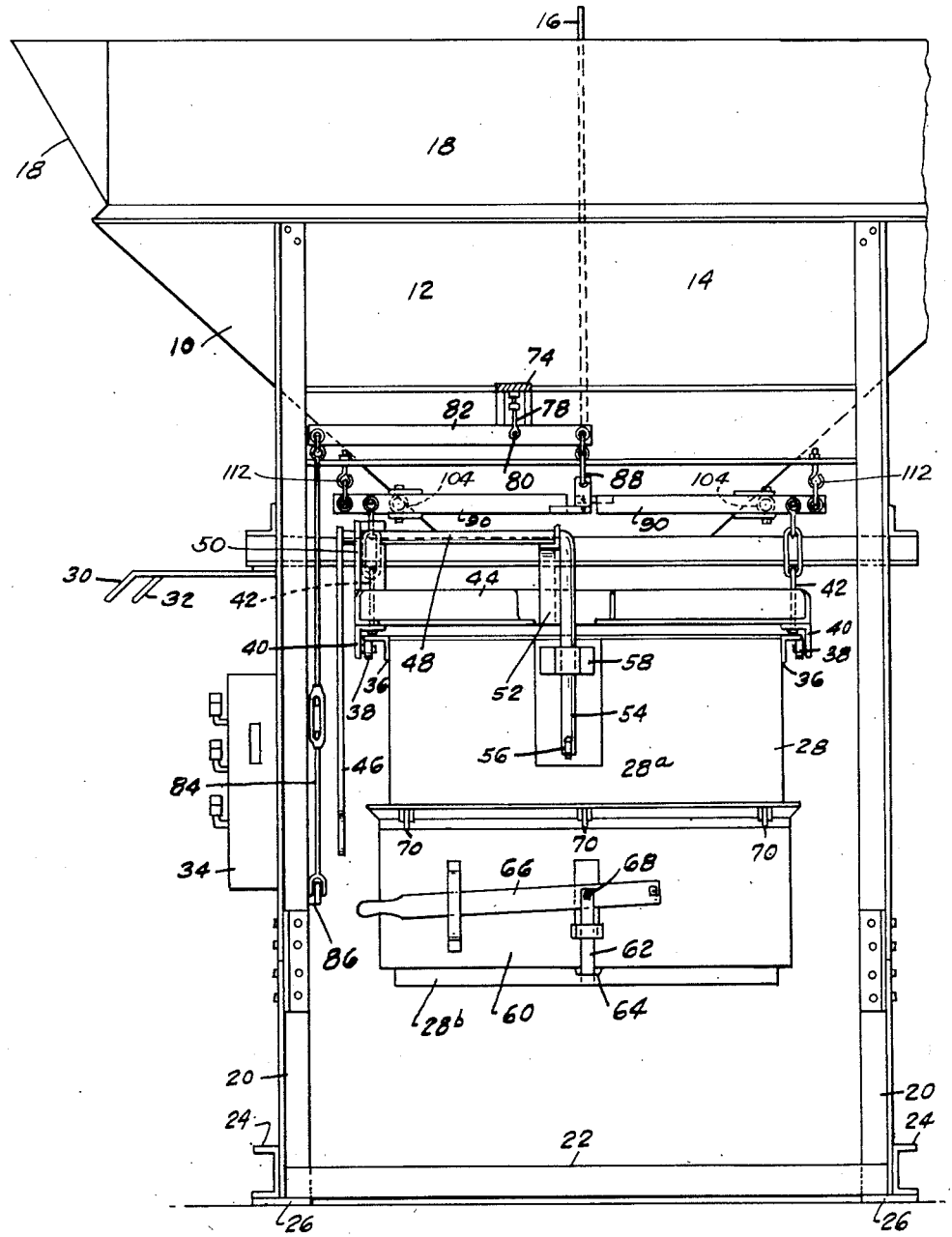
Fig. 1 is a front elevational view of a combined multiple bin hopper and weighing equipment constructed in accordance with the invention herein disclosed.
Figure 7:
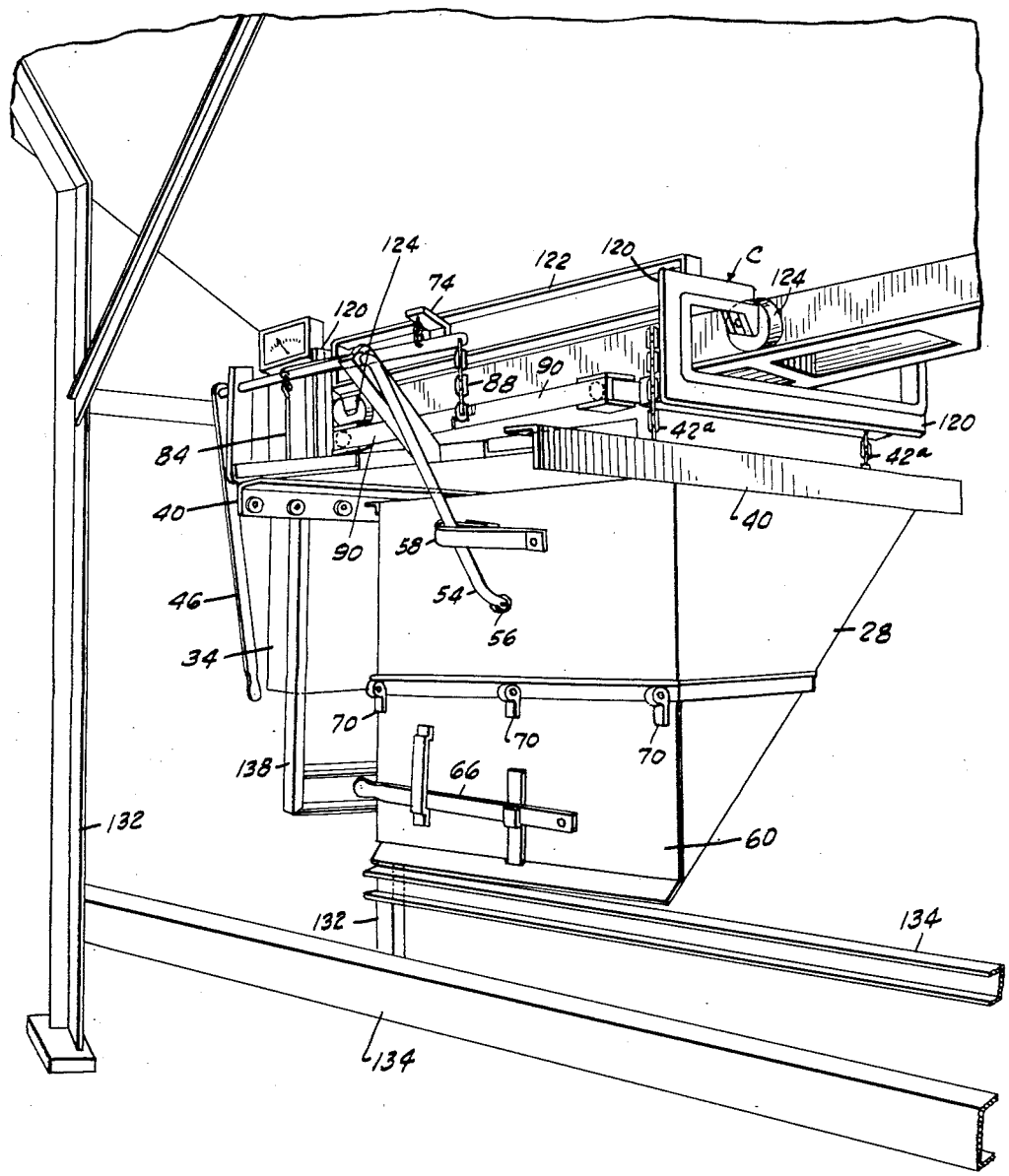
Fig. 7 is a perspective view of a modified form of the invention showing the combined hopper and weighing mechanism mounted upon a carriage supported on rails beneath a plurality of stationary storage bins.
Figure 5:
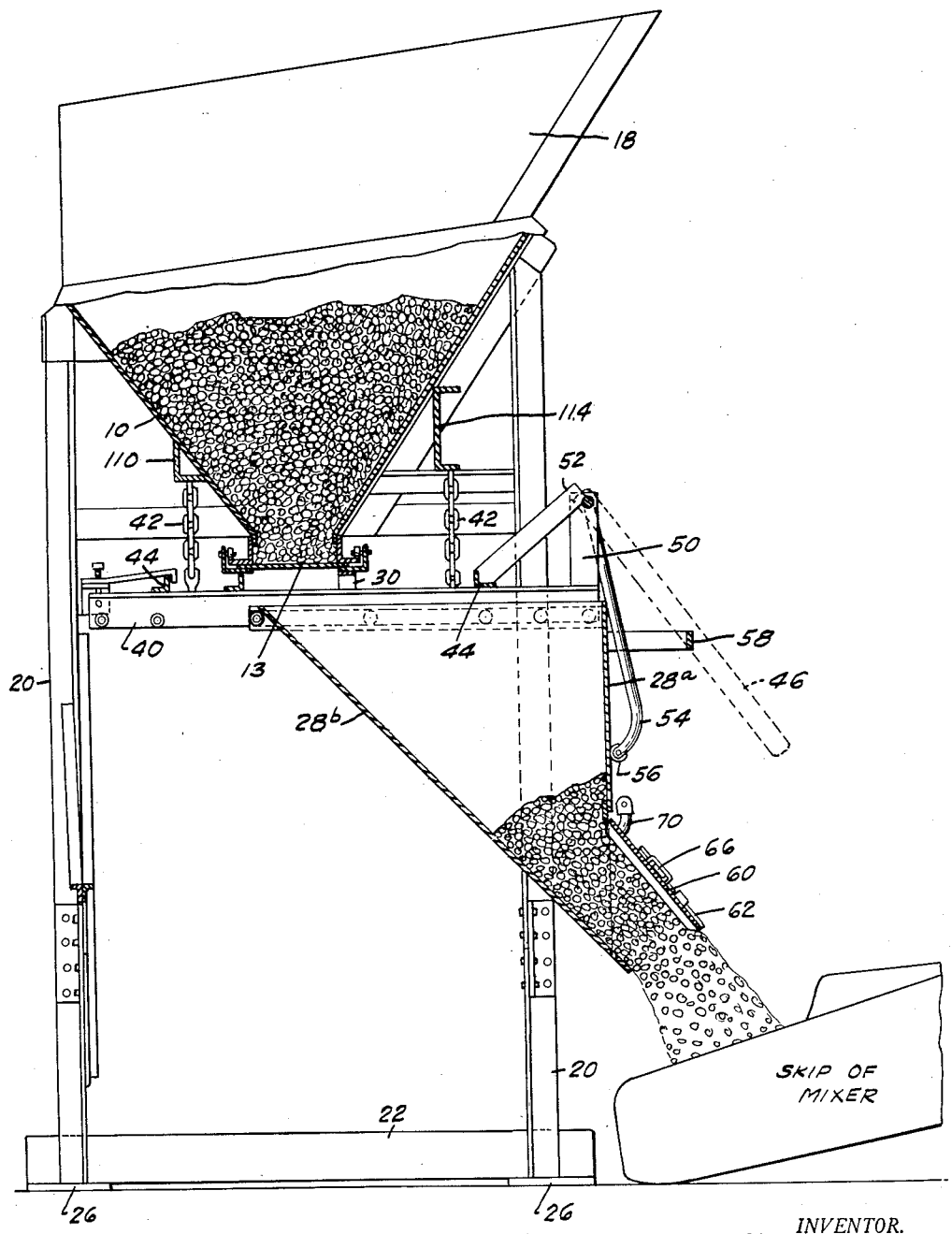
Fig. 5 is a central sectional vertical view taken on the line 5—5 of Fig. 1, showing the multiple hopper in the forward or dumping position.
Figure 4:
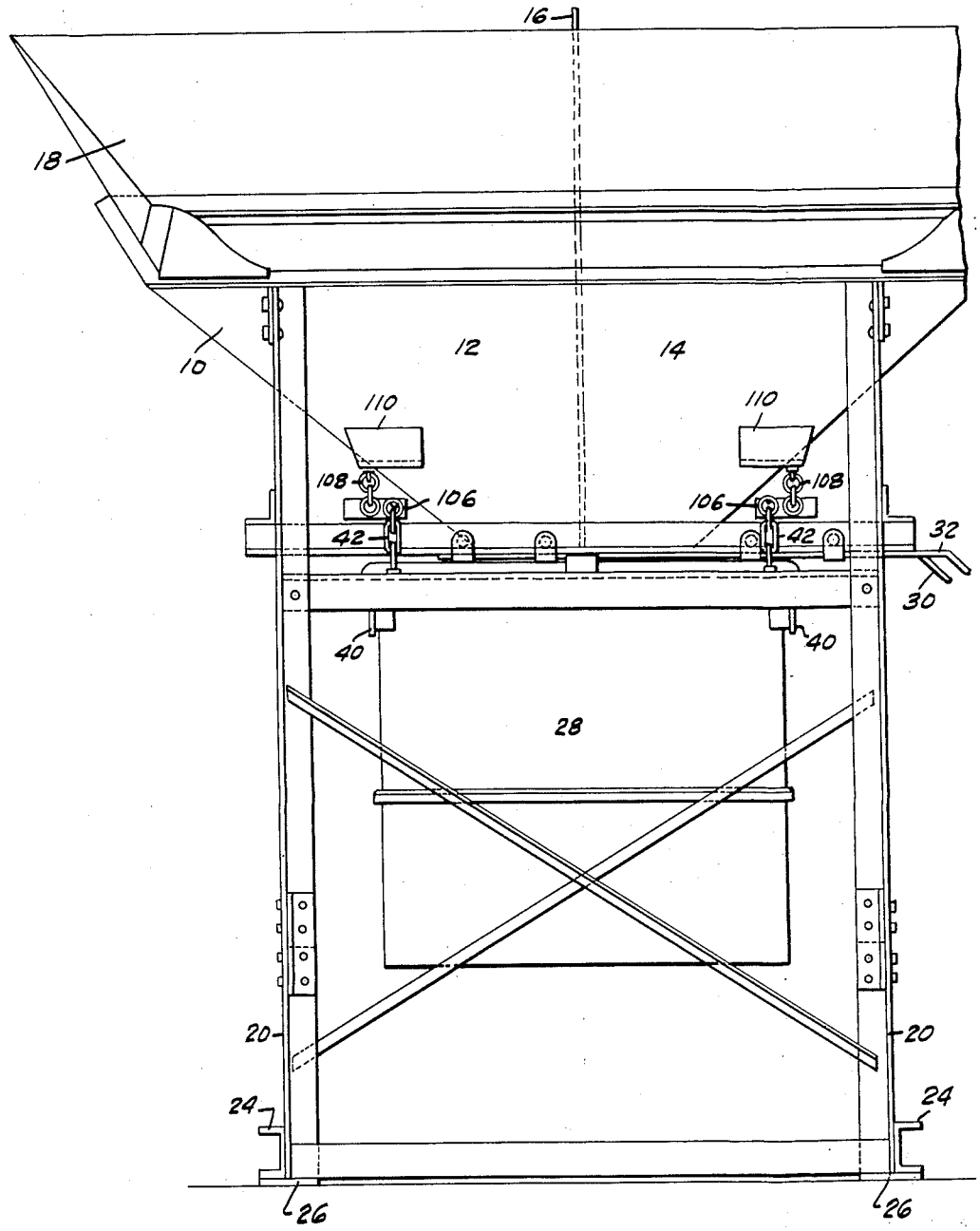
Fig. 4 is a rear elevational view of the machine shown in Fig. 1, a portion of the upper hopper being broken away.
Figure 2:
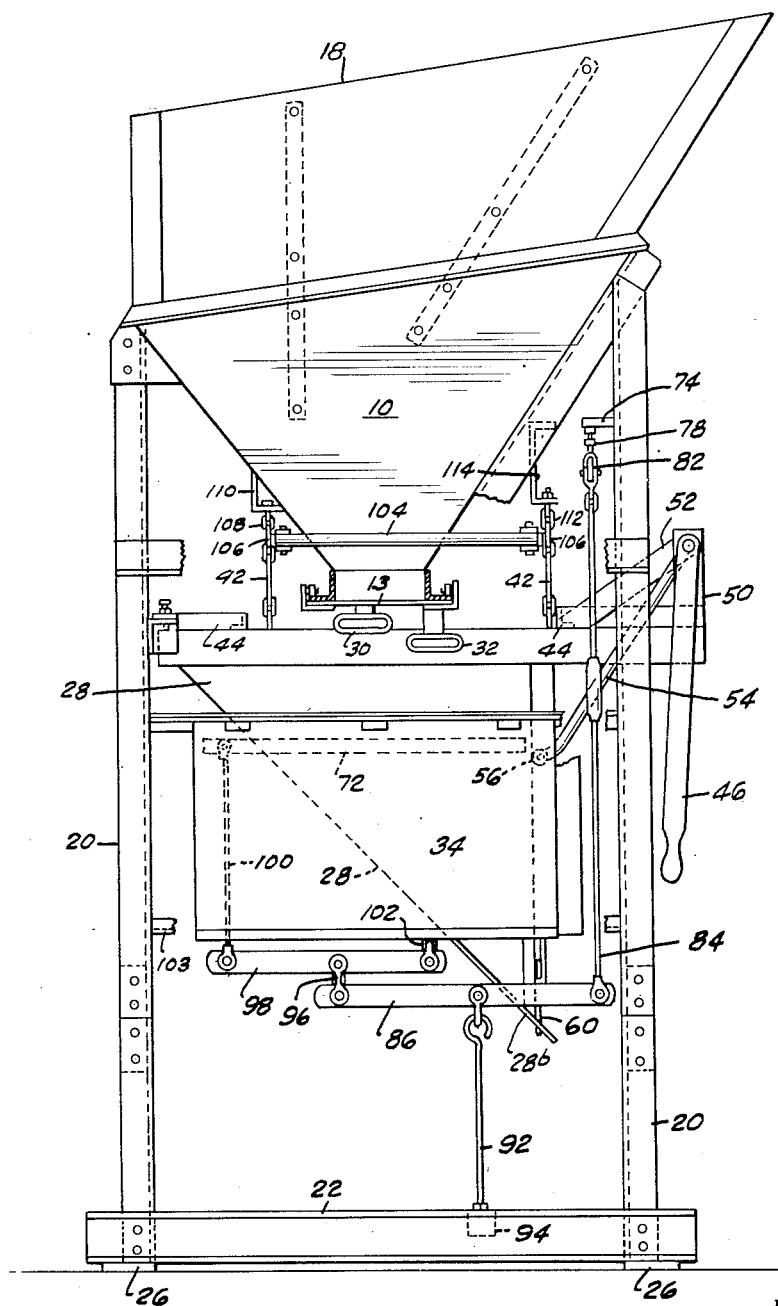
Fig. 2 is an elevational view of the same taken from the left side of Fig. 1, with parts of the framework broken away in section to more clearly show other parts.

In the embodiment of the invention which we have chosen to illustrate and describe the same, in Fig. 1 we have shown a combined twin bin storage hopper 10 provided with two compartments 12 and 14, the hopper 10 being separated generally by a medial vertically disposed dividing wall 16. The storage hopper 10 is preferably shaped generally as an inverted pyramid, and for the purpose of increasing the capacity to permit a larger amount of aggregate to be placed therein, additional side walls 18 may be added to the top of the same.

The storage hopper 10 may be suitably supported upon four corner uprights 20 which are connected at their bases by a pair of angle members 22 across the front and the back of the same, and a pair of channel members 24 across the sides. Suitable pads 26 are provided to form an appropriate base beneath the lower ends of the uprights.

As is well known in the concrete mixing art, in road building, bridge building and other similar concrete construction work, the aggregate which is dumped into either one of the bins 12 or 14 is dropped into an auxiliary weighing hopper provided with a scale for the purpose of securing the correct amount of aggregate with the proper amount of cement placed in the mixer skip, and the aggregate is dumped into the concrete mixer machine, and the cement is dumped into the concrete mixer machine to secure the proper concrete mix that is desired.

In order to save time and labor, it is desirable to have sand, gravel and stone, or other similar mixtures, in separate bins above the weighing hopper 28 so that the exact amount of each may be dumped into the mixer skip to be mixed with the required amount of cement. For this purpose the vertical wall 16 which separates the bins 12 and 14 is provided in the storage hopper 10. As shown and described in the John E. Rose patent herein referred to, separately operable gates or valves 13 are provided at the lower ends of the bins 12 and 14 respectively, the gates being operated by hand levers 30 and 32 extending to the left side of the hopper 10, and directly above the scale 34, as disclosed in the aforementioned Rose patent these gates are in the same horizontal plane and are operated to open by the levers 30 and 32 away from the central vertical wall 16. The weighing scale 34 may be of the type shown and described in U. S. Patent No. 1,985,542, and others.

It has been found desirable in the use of apparatus of the type described to have the weighing hopper 28 so arranged that after weighing of different materials therein has been done, to move the weighing hopper forward so that the material therein may be suitably dumped into the skip of a concrete mixer.

For this purpose the weighing hopper 28 is shown provided with a pair of horizontally disposed downwardly directed angle members 36 along two sides of the top thereof, the angle members 36 being welded to the sides of the hopper 28 and adapted to ride upon suitable rollers 38 which are mounted upon the inner side of downwardly turned angle shaped rail members 40. The rail members 40 are suspended by four linkages 42 which are connected to the weighing linkage in a manner which will be hereinafter described, so that appropriate amounts of different materials may be dumped into the weighing bin 28, properly weighed, and then the weighing hopper 28 may be moved forward on the rollers 38 for dumping. The rail members 40 which are thus suspended are held in spaced parallel relationship by suitable crossbracing 44 adjacent the front and the back of the same.

Means for moving the hopper 28 forward with a load to be dumped may include an operating handle 46 adjacent the left side of the apparatus (see Fig. 1), which is fastened to a horizontally disposed operating rod 48 pivoted in an upright bracket 50 mounted at the front of the left track member 40, the rod 48 extending toward the middle of the front of the hopper 28 and passing through a bracket 52 and then having an arm 54 extending downwardly and carrying a roller 56 at its end, the roller 56 bearing against the front wall 28a of the hopper 28.

Figure 3:
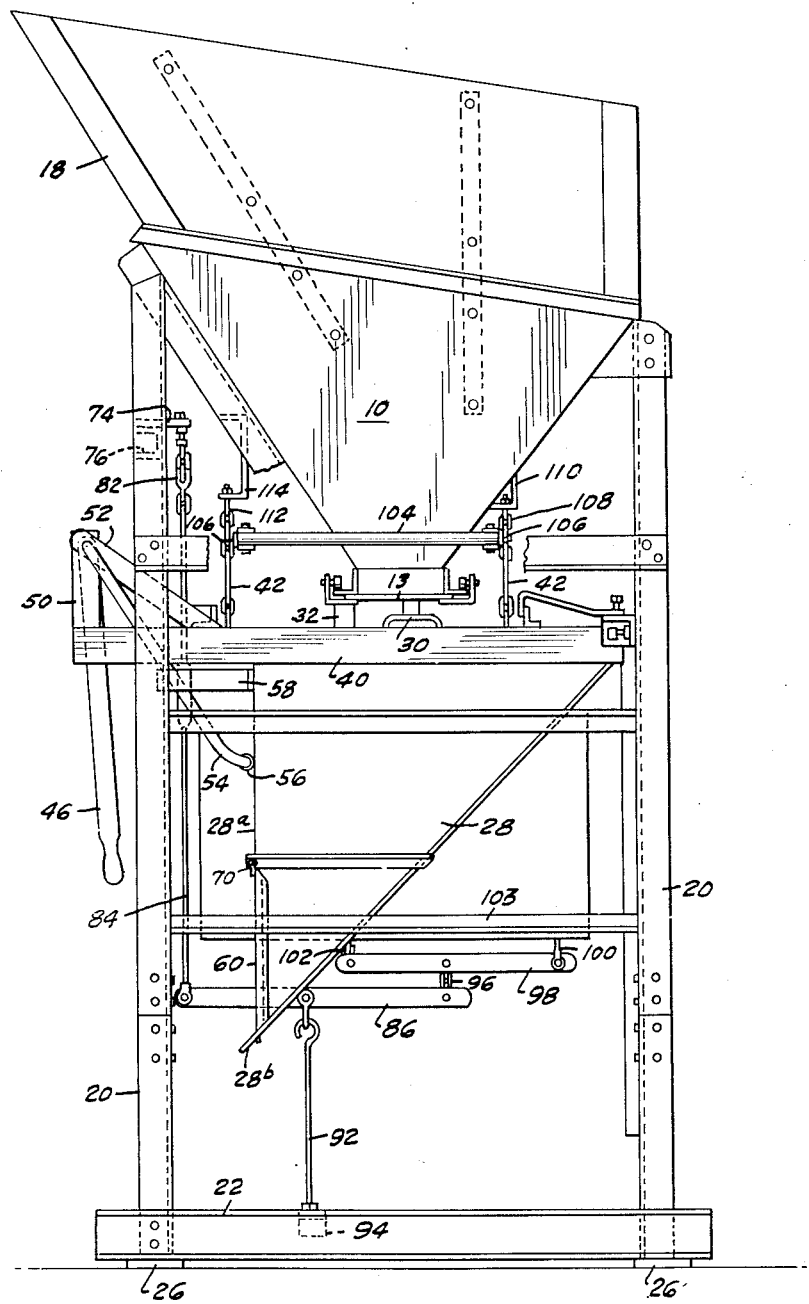
Fig. 3 is an elevational view from the right side of Fig. 1, with portions of the cross-braces broken in section to more clearly show other parts.

The U-shaped bracket 58 is fastened to the front wall 28a of the hopper 28 adjacent the top thereof, the arm 54 passing therethrough so that when the handle 46 (see Fig. 3) is pulled forward, the arm portion 54 will bear against the inside of the bracket 58 and pull the hopper 28 forward. For moving the hopper back to a weighing position, the roller 56 at the end of arm 54 bears against the front wall 28a of the hopper and pushes it back to receiving position on the rollers 38.

The hopper 28 is provided with a discharge opening normally closed by the door 60 which has a latch bar 62 that passes through an opening 64 in the sloping wall 28b of the hopper 28 in closed position, and which may be raised to unlatch the same by the pivoted handle 66 connected at 68 to the bar 62. The door 60 is mounted at its upper edge on suitable hinges 70.

In order to connect the suspended rail and hopper to the tare bar 72 of the scale 34, we have provided a fulcrum 74 connected to a cross-brace 76 between the forward uprights 20 of the storage hopper 10. A link 78 having a pivot 80 connects to a balancing arm 82 which is connected at one end by a linkage 84 to the end of a pivoted arm 86 and at the other end by a link 88 to a pair of weigh beam arms 90. The arm 86 is pivotally connected by a linkage 92 to a stationary support 94 fastened to the side horizontal brace 22 of the support frame. The opposite end of the arm 86 is pivotally connected by a linkage 96 to an arm 98 pivotally connected by a link 100 at one end to the tare bar 72 and pivotally connected by a link 102 to a stationary cross-brace 103 between the upright support members 20.

The weigh bars 90 which support the rail members 40 at the front end of the machine, area connected by torque tubes 104 to arms 106, the arms 106 being connected at their ends by link members 108 to the angle member 110 that is rigidly fastened to the side of the hopper 10. The extended ends of the weigh beam arms 90 are also pivotally connected by link members 112 to a faced channel member support 114 fastened to the front of the storage bin 10.

Through the system of linkage and leverage employed, it can be seen that the weight of the weighing hopper and material that is placed in the same is directly transmitted to the tare bar of the weighing scale so that it is accurately defined.

In Figs. 7 to 13 we have shown a modified form of construction wherein the rail members 40 supporting the hopper 28 may be suspended by means of the linkage 42a from a wheeled carriage C. The wheeled carriage may comprise a pair of C-frame members 120 which are connected together adjacent their upper ends by means of channel-shaped members 122.

Each of the members 120 carries a pair of rollers 124 which ride upon tracks 126 adjacent the lower end of a multiple storage bin 128. In the construction shown in the drawings, the bin 128 may have a plurality of dividing walls 130 to provide in effect a triple storage bin, the ensemble being supported at its four corners by uprights 132 connected adjacent their lower ends by crossbraces 134. The carriage C also carries a suitable framework 138 adjacent the left side of the hopper 28 for supporting the scale 34.

Each of the individual bins of the multiple storage bin 128 is provided with a flat rectangularly shaped bottom door 140 which has a pair of angle members 142 connected to the bottom of the same. The pairs of angle members 142 connected to each door are adapted to ride upon a pair of rollers 144 which are connected to the dividing walls 130 below the tracks 126. The angle members 142 extend to the right of the opening (see Figs. 9 and 10) and each set of angle members 142 is connected by a horizontally disposed rod member 142.

Means for opening any one of the doors 140 may include an L-shaped handle 150 which is rigidly connected to a horizontal rod 152 that is mounted in suitable bearings 154 on top of each of the C-frame members 120. The rod 152 carries a pair of L-shaped arms 156, each of which has an H-member 158 suspended therebelow, the lower legs of the same adapted to embrace one of the rods 146. Thus when the handle 150 is swung in a clockwise direction the H-members 158 will engage the rod 146 of the particular door and move it to the left of the bin opening, permitting material therein to be discharged.

As the wheeled carriage C is moved back and forth on the rails 126, the H-frame members will raise up and pass over the ends of the angle members 142 (see Fig. 13), so that they will engage any one of the doors at which the carriage has stopped. To limit the movement of the traveling carriage C on the tracks 126, we provide a pair of stop members 160 which may be bolted upon one of the tracks 126 through any one of a series of openings provided therein for that purpose.

In order to prevent the C-carriage from tilting when the filled weighing hopper 28 is moved forward as for dumping, we have provided a pair of rollers 170 positioned on the C-frame members 120 to limit any tilting which might take place, the rollers normally being spaced away from the bottom of the track 126.

While we have illustrated and described a specific embodiment of the invention, it will be apparent to those skilled in the art that changes and modifications may be made in the exact details shown, and we do not wish to be limited in any particular; rather what we desire to secure and protect by Letters Patent of the United States is:

1. In apparatus of the class described, the combination of a multiple bin hopper, vertical upright members supporting said hopper thereabove, a weighing scale fixedly connected to said vertical supports, a weighing linkage, a pair of horizontal rails in the nature of inverted angles suspended from said weighing linkage below said stationary hopper, rollers on the vertical legs of said rails, and a weighing hopper, said hopper having a pair of inverted angles fastened along parallel top edges of said hopper, the aligned legs of said inverted angles riding on said rollers, whereby material from said stationary hoppers may be dumped into said weighing hopper and weighed and then said weighing hopper may be moved forward on the rollers of said rails to dump the same.

2. In apparatus of the class described, the combination of a multiple bin hopper, vertical upright members supporting said hopper thereabove, a weighing scale fixedly connected to said vertical supports, a weighing linkage, a pair of horizontal rails in the nature of inverted angles suspended from said weighing linkage below said stationary hopper, rollers on the vertical legs of said rails, a weighing hopper, said hopper having a pair of inverted angles fastened along parallel top edges of said hopper, the aligned legs of said inverted angles riding on said rollers, whereby material from said stationary hoppers may be dumped into said weighing hopper and weighed and then said weighing hopper may be moved forward on the rollers of said rails to dump the same, and a pivoted handle for moving said weighing hopper back and forth.

3. In apparatus of the class described, the combination of a multiple bin hopper, vertical upright members supporting said hopper thereabove, a weighing scale fixedly connected to said vertical supports, a weighing linkage, a pair of horizontal rails in the nature of inverted angles suspended from said weighing linkage below said stationary hopper, rollers on the vertical legs of said rails, a weighing hopper, said hopper having a pair of inverted angles fastened along parallel top edges of said hopper, the aligned legs of said inverted angles riding on said rollers, whereby material from said stationary hoppers may be dumped into said weighing hopper and weighed and then said weighing hopper may be moved forward on the rollers of said rails to dump the same, and a pivoted handle for moving said weighing hopper back and forth, said horizontal rails having upwardly extending brackets and said handle having a horizontal bar portion pivoted in said brackets.

4. In apparatus of the class described, the combination with an aligned row of material storage bins having parallel horizontally disposed tracks along the lower edges of the same, each of said storage bins having a bottom opening and a horizontally disposed door normally closing each of the same, of a wheeled carriage capable of back and forth movement on said tracks below said storage bins, said wheeled carriage comprising generally a rectangular frame having parallel C-shaped end brackets, parallel I-beams connecting said brackets, a roller mounted at the inturned edge of each of said brackets, said roller disposed on said tracks, a rail suspended at its ends from each of said C-shaped brackets, rollers on each of said rails, and a weighing hopper supported on said rollers, said wheeled carriage having a weighing scale associated therewith for weighing said hopper and material dumped therein from any of said bins.

5. In apparatus of the class described, the combination with an aligned row of material storage bins having parallel horizontally disposed tracks along the lower edges of the same, each of said storage bins having a rectangularly shaped bottom opening and a rectangularly shaped horizontally disposed door normally closing each of the same, of a wheeled carriage capable of back and forth movement on said tracks below said storage bins, said wheeled carriage comprising generally a rectangular frame having parallel C-shaped end brackets, parallel I-beams connecting said brackets, a roller mounted at the inturned edge of each of said brackets, said roller disposed on said tracks, a rail suspended at its ends from each of said C-shaped brackets, rollers on each of said rails, and a weighing hopper supported on said rollers, said wheeled carriage having a weighing scale associated therewith for weighing said hopper and material dumped therein from any of said bins.

6. In apparatus of the class described, the combination with an aligned row of material storage bins having parallel horizontally disposed tracks along the lower edges of the same, each of said storage bins having a rectangularly shaped bottom opening and a rectangularly shaped horizontally disposed door normally closing each of the same, of a wheeled carriage capable of back and forth movement on said tracks below said storage bins, said wheeled carriage comprising generally a rectangular frame having parallel C-shaped end brackets, parallel I-beams connecting said brackets, a roller mounted at the inturned edge of each of said brackets, said roller disposed on said tracks, a rail suspended at its ends from each of said C-shaped brackets, rollers on each of said rails, and a weighing hopper supported on said rollers, said wheeled carriage having a weighing scale associated therewith for weighing said hopper and material dumped therein from any of said bins, each of said storage bin doors having a pair of angle members extending forward therefrom, a rod connecting each pair of angle members and an operating handle mounted on said wheeled carriage for selectively opening and closing any one of said doors.

7. In apparatus of the class described, the combination with an aligned row of material storage bins having parallel horizontally disposed tracks along the lower edges of the same, each of said storage bins having a bottom opening and a horizontally disposed door normally closing the same, of a wheeled carriage capable of back and forth movement on said tracks below said storage bins, said wheeled carriage comprising generally a rectangular frame having parallel C-shaped end brackets, parallel cross-members connecting said brackets, a pair of rollers mounted on each of said brackets to suspend the carriage from said tracks, a rail suspended at its ends from each of said C-shaped brackets, said rails rigidly connected together, rollers on each of said rails, and a weighing hopper supported on said rollers, said wheeled carriage having a weighing scale associated therewith for weighing said hopper and material dumped therein from any of said bins.

8. In apparatus of the class described, the combination with an aligned row of material storage bins having parallel horizontally disposed tracks along the lower edges of the same, each of said storage bins having a bottom opening and a horizontally disposed door normally closing the same, of a wheeled carriage capable of back and forth movement on said tracks below said storage bins, said wheeled carriage comprising generally a rectangular frame having parallel C-shaped end brackets, parallel cross-members connecting said brackets, a pair of rollers mounted on each of said brackets to suspend the carriage from said tracks, a rail suspended at its ends from each of said C-shaped brackets, said rails rigidly connected together, rollers on each of said rails, and a weighing hopper supported on said rollers, said wheeled carriage having a weighing scale associated therewith for weighing said hopper and material dumped therein from any of said bins, each of said storage bin doors having a pair of angle members extending forward therefrom, a rod connecting each pair of angle members and an operating handle mounted on said wheeled carriage for selectively opening and closing any one of said doors.

9. Mechanism for storing and weighing material such as sand or gravel, comprising a storage hopper in the form of an inverted pyramid, said hopper having a dividing wall therein perpendicular to the front of said hopper and separating the hopper into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a pair of rails suspended from said hopper, rollers carried by said rails, a weighing hopper mounted on said rollers and positioned below both of said valves to receive material from either storage bin, and a scale, said storage hopper having supports comprising vertical angle members at all four corners of the same, a cross-brace therebetween, said scale fastened to said cross-brace, a tare bar in said scale and a scale linkage between said scale and said pair of rails.

10. Mechanism for storing and weighing material such as sand or gravel, comprising a storage hopper in the form of an inverted pyramid, said hopper having a dividing wall therein perpendicular to the front of said hopper and separating the hopper into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a pair of rails suspended from said hopper, rollers carried by said rails, a weighing hopper mounted on said rollers and positioned below both of said valves to receive material from either storage bin, and a scale, said storage hopper having supports comprising vertical angle members at all four corners of the same, a cross-brace therebetween, said scale fastened to said cross-brace, a tare bar in said scale and a scale linkage between said scale and said pair of rails, said weighing hopper adapted to be moved forward on the rollers carried by said rails for dumping material therefrom.

11. Mechanism for storing and weighing material such as sand or gravel, comprising a storage hopper in the form of an inverted pyramid, said hopper having a dividing wall therein perpendicular to the front of said hopper and separating the hopper into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a pair of rails suspended from said hopper, rollers carried by said rails, a weighing hopper mounted on said rollers and positioned below both of said valves to receive material from either storage bin, means for moving said weighing hopper back and forth on said rollers, and a scale, said storage hopper having supports comprising vertical angle members at all four corners of the same, a cross-brace therebetween, said scale fastened to said cross-brace, a tare bar in said scale and a scale linkage between said scale and said pair of rails.

12. Mechanism for storing and weighing material such as sand or gravel, comprising a storage hopper in the form of an inverted pyramid, said hopper having a dividing wall therein perpendicular to the front of said hopper and separating the hopper into two storage bins, each of said storage bins having a rectangularly shaped bottom opening, the lower end of said dividing wall extending below said openings, a valve for each bin below each of said openings, each of said valves comprising a horizontally disposed rectangular plate having upwardly extending angle members attached thereto, rollers carried by said angle members, parallel tracks on the sides of the bottom openings of said storage bins upon which said rollers support said valves, an operating handle connected to each of said valves, said handles both located on the same side of said mechanism, a pair of rails suspended from said hopper, rollers carried by said rails, a weighing hopper mounted on said rollers and positioned below both of said valves to receive material from either storage bin, means for moving said weighing hopper back and forth on said rollers, and a scale, said storage hopper having supports comprising vertical angle members at all four corners of the same, a cross-brace therebetween, said scale fastened to said cross-brace, a tare bar in said scale and a scale linkage between said scale and said pair of rails, said means for moving said weighing hopper comprising a handle pivoted on a bracket carried by said rails and connected to the front of said weighing hopper.

13. In apparatus of the class described, the combination with a plurality of stationary storage bins having parallel horizontal tracks below the same, of a wheeled carriage capable of back and forth movement on said tracks below said storage bins, said wheeled carriage having rails suspended therebelow, rollers on said rails and a weighing hopper mounted on said rollers, said wheeled carriage having a weighing scale associated therewith for weighing said hopper and material dumped therein from any of said bins, said wheeled carriage including a pair of rigidly connected C-frames having single rollers at the inturned ends of the same.

14. In apparatus of the class described, the combination with a plurality of stationary storage bins having parallel horizontal tracks below the same, of a wheeled carriage capable of back and forth movement on said tracks below said storage bins, said wheeled carriage having rails suspended therebelow, rollers on said rails and a weighing hopper mounted on said rollers, said wheeled carriage having a weighing scale associated therewith for weighing said hopper and material dumped therein from any of said bins, said wheeled carriage including a pair of rigidly connected C-frames having single rollers at the inturned ends of the same, said C-frames having brackets secured thereto adjacent their ends and chains suspended therefrom connected to said rails.

15. In apparatus of the class described, the combination with an aligned row of material storage bins having parallel horizontally disposed tracks along the lower edges of the same, of a wheeled carriage capable of back and forth movement on said tracks below said storage bins, comprising a generally rectangular frame having parallel C-shaped end brackets, a roller mounted at the inturned edge of each of said brackets, rails suspended at two points from each of said C-shaped brackets, rollers on said rails and a weighing hopper mounted on said rollers, said wheeled carriage having a weighing scale associated therewith for weighing said hopper and material dumped therein from any of said bins.

16. In apparatus of the class described, the combination with an aligned row of material storage bins having parallel horizontally disposed tracks along the lower edges of the same, of a wheeled carriage capable of back and forth movement on said tracks below said storage bins, comprising a generally rectangular frame having parallel C-shaped end brackets, a roller mounted at the inturned edge of each of said brackets, rails suspended at two points from each of said C-shaped brackets, rollers on said rails and a weighing hopper mounted on said rollers, said wheeled carriage having a weighing scale associated therewith for weighing said hopper and material dumped therein from any of said bins, said weighing scale rigidly connected at one side of one of said C-shaped brackets.

References Cited in the file of this patent

UNITED STATES PATENTS

| Re. 23,940 | Fisher | Feb. 8, 1955 |
| 1,687,894 | Ruggles | Oct. 16, 1928 |
| 1,750,244 | Robb | Mar. 11, 1930 |
| 1,766,620 | Fitch | June 24, 1930 |
| 2,127,120 | Johnson et al. | Aug. 16, 1938 |
| 2,565,792 | Wagner et al. | Aug. 4, 1951 |
| 2,737,315 | Rose | Mar. 6, 1956 |